(12) United States Patent
Schaefer et al.

(10) Patent No.: US 11,952,934 B2
(45) Date of Patent: Apr. 9, 2024

(54) SPARK-IGNITED RECIPROCATING PISTON INTERNAL COMBUSTION ENGINE COMPRISING A PRE-CHAMBER IGNITION SYSTEM

(71) Applicant: Bayerische Motoren Werke Aktiengesellschaft, Munich (DE)

(72) Inventors: Erik Schaefer, Munich (DE); Daniel Taterra, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/908,209

(22) PCT Filed: Feb. 4, 2021

(86) PCT No.: PCT/EP2021/052646
§ 371 (c)(1),
(2) Date: Aug. 30, 2022

(87) PCT Pub. No.: WO2021/175536
PCT Pub. Date: Sep. 10, 2021

(65) Prior Publication Data
US 2023/0332533 A1    Oct. 19, 2023

(30) Foreign Application Priority Data

Mar. 5, 2020    (DE) .................... 10 2020 105 921.3

(51) Int. Cl.
*F02B 19/18*    (2006.01)
*F02B 19/10*    (2006.01)
(Continued)

(52) U.S. Cl.
CPC .......... *F02B 19/18* (2013.01); *F02B 19/1014* (2013.01); *F02B 19/12* (2013.01); *H01T 13/54* (2013.01)

(58) Field of Classification Search
CPC ...... F02B 19/18; F02B 19/1014; F02B 19/12; H01T 13/54
See application file for complete search history.

(56) References Cited

U.S. PATENT DOCUMENTS 4,092,969 A    6/1978  Ono et al.
4,924,829 A *  5/1990  Cheng .................. H01T 13/462
                                                   123/169 PA
(Continued)

FOREIGN PATENT DOCUMENTS

DE    26 33 904 C2    2/1977
DE    33 31 116 A1    3/1985
(Continued)

OTHER PUBLICATIONS

PCT/EP2021/052646, International Search Report dated Apr. 28, 2021 (Two (2) pages).
(Continued)

*Primary Examiner* — Phutthiwat Wongwian
*Assistant Examiner* — Arnold Castro
(74) *Attorney, Agent, or Firm* — Crowell & Moring LLP

(57) ABSTRACT

A spark-ignited reciprocating piston internal combustion engine includes a pre-chamber ignition system with a housing which is installed in a cylinder head of the spark-ignited reciprocating piston internal combustion engine. An ignition apparatus is disposed in the pre-chamber ignition system and the ignition apparatus protrudes into a cavity in the housing. The cavity is covered by a cover with respect to a combustion chamber of the spark-ignited reciprocating piston internal combustion engine and the cover has at least one aperture which connects the cavity and the combustion chamber to one another in a gas-conducting manner. The housing has a volume and the at least one aperture has a jet (Continued)

cross section and a ratio of the volume to the jet cross section is greater than 100 and less than 300.

5 Claims, 1 Drawing Sheet

(51) Int. Cl.
*F02B 19/12* (2006.01)
*H01T 13/54* (2006.01)

(56) References Cited

U.S. PATENT DOCUMENTS

| | | | | |
|---|---|---|---|---|
| 4,926,818 | A * | 5/1990 | Oppenheim | F02B 19/109 123/297 |
| 4,987,868 | A * | 1/1991 | Richardson | H01T 13/54 313/143 |
| 5,105,780 | A * | 4/1992 | Richardson | H01T 13/54 123/169 PA |
| 7,082,920 | B2 | 8/2006 | Robinet et al. | |
| 7,210,447 | B2 * | 5/2007 | Robinet | F02B 19/12 123/270 |
| 7,438,043 | B2 * | 10/2008 | Shiraishi | F02B 19/16 123/266 |
| 9,217,360 | B2 * | 12/2015 | Pierz | F02B 19/1009 |
| 10,109,986 | B2 | 10/2018 | Niessner et al. | |
| 10,550,757 | B2 * | 2/2020 | Rabhi | F02B 17/005 |
| 11,359,537 | B1 * | 6/2022 | Gastaldi | F02F 1/40 |
| 2012/0103302 | A1 * | 5/2012 | Attard | F02B 19/108 123/260 |
| 2012/0248964 | A1 * | 10/2012 | Thomas | H01T 13/54 313/141 |
| 2014/0261298 | A1 * | 9/2014 | Sasidharan | F02B 19/12 123/286 |
| 2017/0145898 | A1 * | 5/2017 | Schäfer | F02P 13/00 |
| 2023/0103567 | A1 * | 4/2023 | Hageneder | H01T 13/54 123/293 |
| 2023/0175428 | A1 * | 6/2023 | Harada | F02B 19/12 123/253 |

FOREIGN PATENT DOCUMENTS

| | | |
|---|---|---|
| DE | 10 2014 111 897 A1 | 4/2015 |
| DE | 10 2016 206 992 A1 | 10/2017 |
| DE | 10 2016 120 984 A1 | 5/2018 |
| DE | 10 2017 219 560 A1 | 5/2018 |
| DE | 10 2018 220 177 A1 | 5/2020 |
| WO | WO 2008/031482 A1 | 3/2008 |

OTHER PUBLICATIONS

German Search Report issued in German application No. 10 2020 105 921.3 dated Oct. 23, 2020, with Statement of Relevancy (Seven (7) pages).

* cited by examiner

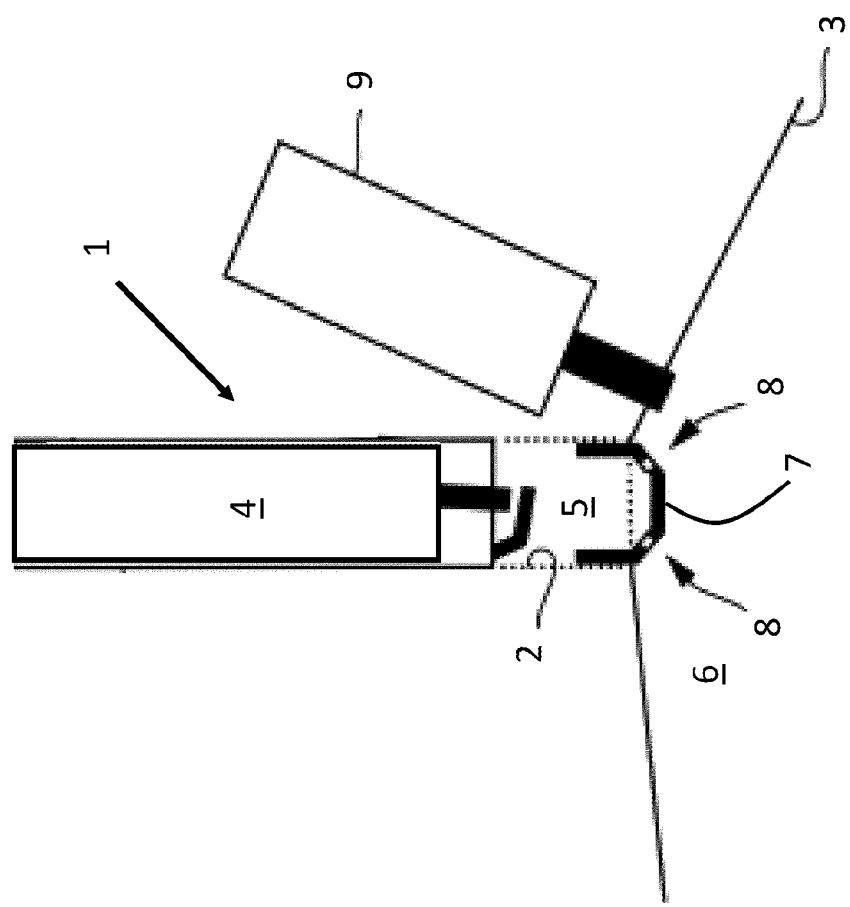

SPARK-IGNITED RECIPROCATING PISTON INTERNAL COMBUSTION ENGINE COMPRISING A PRE-CHAMBER IGNITION SYSTEM

BACKGROUND AND SUMMARY OF THE INVENTION

The invention relates to a spark-ignited reciprocating piston internal combustion engine with a pre-chamber ignition system.

With regard to the technical environment, reference is made, for example, to German laid open specification DE 10 2014 111 897 A1. This specification has disclosed an ignition device for igniting fuel/air mixtures in a combustion chamber of an internal combustion engine by means of a corona discharge, with an ignition electrode, an outer conductor which surrounds the ignition electrode and has a front and a rear end, and with an electrical insulator which is arranged between the ignition electrode and the outer conductor and from which at least one tip of the ignition electrode protrudes. The at least one tip of the ignition electrode lies in a space which is shielded by way of a cap which is assigned to the insulator and has an inner side facing the insulator, an outer side facing away from the insulator and one or more holes, through which the shielded space is connected to a space which lies on the outer side of the cap, the combustion chamber.

Furthermore, the international patent application with the international publication number WO 2008/031482 A2 has disclosed a spark plug for igniting a combustible gas mixture in the internal combustion engine, comprising:
an ignition electrode,
an electrical supply line, to which the ignition electrode is connected,
an insulator body, through which the supply line is routed,
a housing head which is seated sealingly on the insulator body, and an external thread for screwing into an internal combustion engine,
a tubular housing which is fastened to the housing head, surrounds the insulator body and carries a hexagonal socket,
the tubular housing surrounding an insulator body holder which is welded via a welded seam to the housing head and presses the insulator body against the housing head with a prestress.

With regard to the further technical environment, furthermore, reference is made to German laid open specification DE 10 2016 120 984 A1. This laid open specification has disclosed a pre-chamber spark plug for an internal combustion engine which is operated using gas, and a method for producing it.

Furthermore, German laid open specification DE 10 2016 206 992 A1 has disclosed a spark plug. The spark plug is, in particular, a pre-chamber spark plug, with a housing, an ignition electrode and a ground electrode, it being possible for the ignition electrode to be loaded with an electrical voltage via a supply line, and the supply line running at least partially within an insulator, at least one discharge region of the housing being produced from a material with a thermal conductivity of above 150 W/mK.

Passive and active pre-chamber spark plug variants have a certain number of apertures in their covers for the passage of flames into the combustion chamber, and they differ from one another, above all, in terms of the number of apertures, their diameter and their orientation.

With regard to lambda=1 (stoichiometric) operation of the internal combustion engine in the entire engine map, it is decisive to lower the exhaust gas temperature upstream of the turbine of an exhaust gas turbocharger and the exhaust gas temperature in the catalytic converter, in order to avoid thermal component damage.

It is a disadvantage of these known pre-chamber ignition systems that no gas exchange or scarcely a sufficient gas exchange takes place within the pre-chamber ignition system in the low load and/or rotational speed range of an internal combustion engine, with the result that reliable ignition of the fuel/air mixture is not always ensured in these load and/or rotational speed ranges. A decrease in the exhaust gas temperatures is also to be pursued for stoichiometric operation for component protection reasons.

It is an object of the present invention to specify a measure, by way of which the ignition capability of a pre-chamber ignition system can be ensured in a low load and/or rotational speed range of an internal combustion engine, and the exhaust gas temperatures can be lowered.

According to the invention, the ratio of the volume (=cavity) of the pre-chamber ignition system/jet cross section [$mm^3/mm^2$] should lie between 100 and 300, and should preferably be greater than 150 and less than 220. A ratio below 150 leads to a slowed combustion in the combustion chambers of the internal combustion engine which is not sufficient for lowering the exhaust gas temperature at an engine output per unit of displacement of 120 kW/l. The volume is understood to mean the volume of the pre-chamber ignition system, and the jet cross section is defined as the sum of the cross sections of all the apertures in the cover of the pre-chamber ignition system toward the combustion chamber.

If the ratio of volume/jet cross section [$mm^3/mm^2$] lies between 150 and 220, the combustion jets which exit from the pre-chamber ignition system in the case of a combustion operation have the greatest penetration depth into the combustion chamber, which leads to a rapid combustion. The more rapid the combustion, the more rapidly possible knock zones are also ignited. In addition, the exhaust gas temperature decreases in an advantageous way.

It has been shown to be particularly advantageous if the aperture in the cover consists of at least three part apertures; the penetration depth of the combustion jets into the combustion chamber is then particularly great, for reliable ignition of the fuel/air mixture.

In the following text, the invention is explained briefly on the basis of one exemplary embodiment.

BRIEF DESCRIPTION OF THE DRAWING

The FIGURE shows a section through a pre-chamber ignition system.

DETAILED DESCRIPTION OF THE DRAWING

The FIGURE shows a section through a pre-chamber ignition system 1 for a spark-ignited reciprocating piston internal combustion engine with a housing 2 which, in this exemplary embodiment, is formed radially on the outside by a cylinder head material of a cylinder head 3 of the reciprocating piston internal combustion engine. An ignition apparatus 4 is arranged in the pre-chamber ignition system 1, which ignition apparatus 4 protrudes into a cavity 5 in the housing 2. A spark plug, a corona ignition system or some other ignition apparatus for spark-ignited internal combustion engines can be provided as ignition apparatus, for example.

Furthermore, the cavity 5 is covered with respect to a combustion chamber 6 of the reciprocating piston internal combustion engine by a cover 7 on the side which faces away from the ignition apparatus 4. The cover 7 has at least one first aperture 8 which connects the cavity 5 and the combustion chamber 6 to one another in a gas-conducting manner. Two apertures 8 can be seen in the present exemplary embodiment. These apertures 8 can be, for example, bores in the cover 7. The cover 7 can itself be connected to the cylinder head 3 in an integrally joined and/or positively locking manner.

Furthermore, a fuel injector 9 can be seen in the FIGURE, by way of which fuel injector 9 fuel can be introduced into the combustion chamber 6 of the reciprocating piston internal combustion engine in order to produce a combustible fuel/air mixture in the combustion chamber 6.

According to the invention, the housing 2 or the cavity 5 has a volume and the at least one aperture 8 has a jet cross section, the ratio of volume to jet cross section being greater than 100 and less than 300, in particular being greater than 150 and less than 220. In a preferred way, the aperture 8 is formed by at least three individual apertures.

EXAMPLE

A cavity 5 of a pre-chamber ignition system 1 has, for example, a volume V of 1848 mm³, and is provided with eight apertures 8 in the form of bores with a diameter D of in each case 1.3 mm.

The calculation is as follows:

$$\text{Ratio} = V\,[\text{mm}^3]/(D^2 * pi/4)\,[\text{mm}^2] * \text{number of apertures}$$
$$= 1848\,[\text{mm}^3]/(1.3^2 * 3.14/4)\,[\text{mm}^2] * 8$$
$$= 1848\,[\text{mm}^3]/10.6\,[\text{mm}^2]$$
$$= 174.3\,[\text{mm}]$$

Finally, it is still to be mentioned that the configuration according to the invention of the pre-chamber ignition system 1 can be used both for passive pre-chamber ignition systems (as shown here) and for active pre-chamber ignition systems, with a dedicated introduction of fuel into the cavity 5.

In a further exemplary embodiment, instead of being formed from the cylinder head material, the housing 2 can also be provided as a separate housing 2 which is introduced into the cylinder head 3.

LIST OF REFERENCE CHARACTERS

1 Pre-chamber ignition system
2 Housing
3 Cylinder head
4 Ignition apparatus
5 Cavity
6 Combustion chamber
7 Cover
8 Aperture
9 Fuel injector

The invention claimed is:

1. A spark-ignited reciprocating piston internal combustion engine, comprising:
   a pre-chamber ignition system with a housing which is installed in a cylinder head of the spark-ignited reciprocating piston internal combustion engine, wherein an ignition apparatus is disposed in the pre-chamber ignition system and wherein the ignition apparatus protrudes into a cavity in the housing;
   wherein the cavity is covered by a cover with respect to a combustion chamber of the spark-ignited reciprocating piston internal combustion engine, wherein the cover has apertures which connect the cavity and the combustion chamber to one another in a gas-conducting manner, and wherein a respective combustion jet is penetrable into the combustion chamber through all of the apertures of the cover;
   wherein a ratio of a volume of the housing to a jet cross section of all of the apertures is greater than 100 and less than 300.

2. The spark-ignited reciprocating piston internal combustion engine according to claim 1, wherein the ratio is greater than 150 and less than 220.

3. The spark-ignited reciprocating piston internal combustion engine according to claim 1, wherein the cover has 3 apertures.

4. The spark-ignited reciprocating piston internal combustion engine according to claim 1, wherein the cover has 8 apertures.

5. The spark-ignited reciprocating piston internal combustion engine according to claim 1, wherein each of the apertures has a diameter of 1.3 mm.

* * * * *